United States Patent [19]

Minagawa et al.

[11] 4,186,018
[45] Jan. 29, 1980

[54] SURFACE TREATMENT OF A SUPPORT MEMBER FOR PHOTOGRAPHIC LIGHT-SENSITIVE MATERIALS

[75] Inventors: Nobuhiko Minagawa; Hiroyuki Kurabayashi, both of Fujimiya, Japan

[73] Assignee: Fuji Photo Film Co., Ltd., Minami-ashigara, Japan

[21] Appl. No.: 627,152

[22] Filed: Oct. 29, 1975

Related U.S. Application Data

[63] Continuation of Ser. No. 167,303, Jul. 29, 1971, abandoned.

[30] Foreign Application Priority Data

Jul. 29, 1970 [JP] Japan .................................. 45-66380

[51] Int. Cl.² .................................................. G03C 1/78
[52] U.S. Cl. .................................... 430/532; 264/345
[58] Field of Search ............................................ 96/87 R

[56] References Cited

U.S. PATENT DOCUMENTS

| | | | |
|---|---|---|---|
| 3,072,483 | 1/1963 | Trevoy et al. | 96/87 |
| 3,255,034 | 6/1966 | Covington et al. | 117/47 |
| 3,375,126 | 3/1968 | Nagel | 117/46 |
| 3,552,986 | 1/1971 | Bassemir et al. | 96/87 R |
| 3,615,552 | 10/1971 | Danhauser et al. | 96/87 R |
| 3,746,564 | 7/1973 | Parsons | 96/87 R |

*Primary Examiner*—Jack P. Brammer
*Attorney, Agent, or Firm*—Sughrue, Rothwell, Mion, Zinn and Macpeak

[57] ABSTRACT

A method for surface treating a support for a photographic light-sensitive material, said support having a polyolefinic surface, which comprises flame treating said surface using a flame supported by a combustion gas consisting of a paraffinic or an olefinic hydrocarbon gas and oxygen gas, said combustion gas having the composition within the area ABCDE of FIG. 2, is disclosed.

5 Claims, 2 Drawing Figures

4,186,018

SURFACE TREATMENT OF A SUPPORT MEMBER FOR PHOTOGRAPHIC LIGHT-SENSITIVE MATERIALS

This is a continuation, Ser. No. 167,303, filed July 29, 1971, now abandoned.

BACKGROUND OF THE INVENTION

1. Field of the Invention

This invention relates to a method for surface treating a photographic support member having a polyolefin surface and more particularly, it is concerned with a method whereby the adhesiveness of a photographic emulsion layer and support is improved by application of a flame containing excess oxygen to the surface of said support.

2. Description of the Prior Art

A previous attempt to give adhesion of printing inks or various coating materials to formed articles of polyolefins consists in subjecting the polyolefin surface to a flame treatment, that is, by exposing to a high temperature flame in a short time (U.S. Pat. No. 2,632,921 and U.S. Pat. No. 2,648,097). The composition of a combustion gas in a flame treatment is described in detail in British Pat. No. 1,010,649.

When the above-described flame treatment is applied to a photographic support having a surface of polyolefin, that is, using the gaseous composition described in British Pat. No. 1,010,649, a sufficient adhesive strength is not obtained between the photographic emulsion layer on the support surface-treated by the flame. Also, a disadvantage in that fog of the light-sensitive emulsion even under non-exposed conditions occurs. Practical use of the flame treatment is thus made difficult.

We, the inventors, have made efforts, in particular, studies on the composition of the combustion gas so as to overcome the foregoing disadvantages in flame treatment and have reached the invention.

SUMMARY OF THE INVENTION

The invention comprises subjecting a surface of polyolefin to a flame treatment using a mixed gas of a paraffinic or olefinic hydrocarbon gas with oxygen as a combustion gas, the mixed gas having the composition as shown in FIG. 2 of the accompanying drawings. The oxygen gas is in great excess to the hydrocarbon gas.

BRIEF DESCRIPTION OF THE ACCOMPANYING DRAWINGS

DETAILED DESCRIPTION OF THE INVENTION

Figure 1:
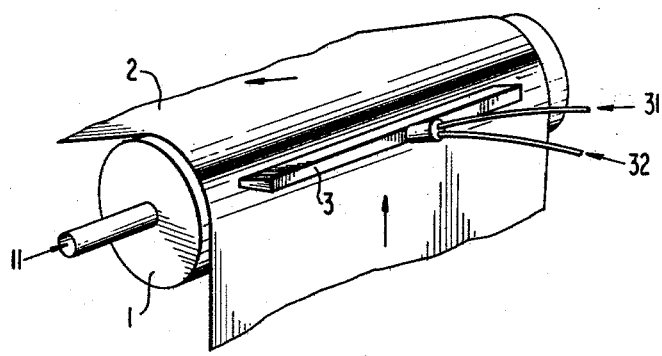
FIG. 1 shows one embodiment of an apparatus for carrying out the method of this invention.

In FIG. 1 is shown an apparatus for carrying out the flame treatment according to the invention. In operation of this apparatus, a flame formed by burner 3 having a flame slit, provided with oxygen feed pipe 31 and combustion gas feed pipe 32, is applied to the surface of support 2 running at a high speed in contact with an inside-cooled drum 1 provided with pipe 11 for feeding cold water to the inside so that the surface temperature of drum 1 does not exceed 80° C., whereby the surface of the support is flame-treated.

The support member used in the invention is a polyolefin film or a polyolefin-coated paper. In the description of this invention, the term polyolefins is intended to include polyethylene, polypropylene and their mixtures. The polyolefin film is obtained by conventional film making methods such as tubular film methods or flat die methods, and the polyolefin-coated paper is obtained by extrusion coating or lamination using adhesives.

The combustion gas used in this invention is a mixed gas of a paraffinic or an olefinic hydrocarbon with oxygen. Typical of such hydrocarbons are methane, ethane, propane, butane, ethylene and propylene and two or more of them are preferably used.

Figure 2:
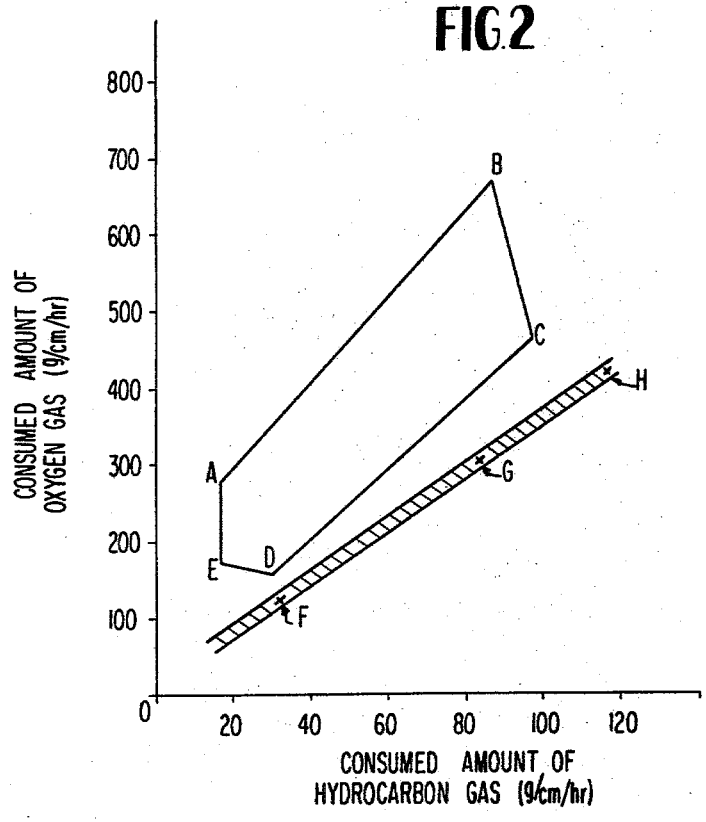
FIG. 2 is a graphical representation showing the composition of the combustion gas used in the method of this invention.

The above-described combustion gas forms a flame by a burner as shown in FIG. 1 and the thus formed flame is applied to the surface of a support running at a rate of from 100 to 400 m/min. The composition of the combustion gas of the invention is shown in FIG. 2, wherein the ordinate is the amount of oxygen consumed per 1 cm width of the flame slit of the burner and per 1 hour (g/cm/hr) and the abscissa is the amount of hydrocarbon consumed per 1 cm width of the frame slit of the burner and per 1 hour. The area inside ABCDE shows the composition of the combustion gas used in the invention. The coordinates of these points, A, B, C, D and E in FIG. 2 are as follows:

TABLE 1

| | Amount of Hydrocarbon Gas Consumed (g/cm/hr) | Amount of Oxygen Consumed (g/cm/hr) |
|---|---|---|
| A | 17 | 280 |
| B | 87 | 670 |
| C | 97 | 460 |
| D | 30 | 160 |
| E | 17 | 170 |

In the composition of the combustion gas, that is to say, corresponding to areas above line AB and on the left side of line AE and ED, the flame is not stable. In the composition of combustion gas, corresponding to areas below lines CD and DE, adhesion of the support member and the photographic emulsion layer is insufficient and fogging of the emulsion occurs. In the composition of combustion gas, corresponding to the area on the right side of line BC, fogging of the emulsion occurs. Shaded area including points FGH in FIG. 2 corresponds to the composition of combustion gas described in British Pat. No. 1,010,649.

The photographic light-sensitive material using a support flame treated using the composition of the combustion gas corresponding to area inside ABCDE shows sufficient adhesion between the support and the photographic emulsion layer without any adverse influences on the photographic emulsion, such as fog.

The following examples are given to illustrate the invention in greater detail.

The test methods of the adhesive strength between a support and photographic emulsion, employed in the Examples, are as follows:

(1) Test method to determine the adhesive strength in the dry state.

The surface of a photographic emulsion is scratched in a cross-hatched manner (at a line interval of 4 mm) using a razor. An adhesive tape is applied thereon and rapidly stripped off. With this method, the adhesion is defined as "good" where the non-stripped area amounts to 90% or more.

(2) Test method to determine the adhesive strength in processing.

In each step of the photographic processing, the surface of the photographic emulsion is scratched using a pencil and the scratched portion is rubbed with the tip of a finger in a manner vertical to the scratched line. In this case, the adhesion is defined as "good" where the photographic emulsion layer is not stripped any more than scratched.

The test method for fog, employed in the Examples, is as follows.

A white light is applied to the emulsion surface of a photographic light-sensitive material and its reflecting factor is measured to give a specific reflecting factor as defined below:

Specific reflecting factor=Reflecting factor of an emulsion surface in the case of carrying out the ordinary processing of a non-exposed photographic light-sensitive material/Reflecting factor of an emulsion surface in the case of carrying out the so-called fixing treatment of the same non-exposed photographic light-sensitive material.

It can be estimated by this method that the larger the value of specific reflecting factor, the less the fog of a photographic emulsion.

EXAMPLE 1

A polyethylene-coated paper was prepared by extrusion coating both surfaces of a photographic paper of 170 g/m$^2$ with polyethylene of a density of 0.92 g/cm$^3$ so as to give a thickness of about 30 microns. The surface to be coated with the emulsion was surface treated with a flame having the following flame composition No. 1 while running the paper at a rate of 100 m/min.

Combustion Gas Composition No. 1

Propane—32 g/cm/hr
Oxygen—300 g/cm/hr

The so obtained support was coated with a gelatino-silver halide emulsion to obtain a water proof photographic paper having excellent adhesiveness between the emulsion layer and the support in processing and in the dry state before and after processing.

On the other hand, with a water proof photographic paper using, as a support, the same polyethylene-coated paper flame treated using the combustion gas composition described in British Pat. No. 1,010,649 while running at a rate of 100 m/min., the emulsion layer was stripped from the support during processing.

Combustion Gas Composition No. 2

Propane—32 g/cm/hr
Oxygen—125 g/cm/hr

EXAMPLE 2

The surface, to be coated with the emulsion, of the polyethylene-coated paper of Example 1 was flame treated using the following combustion gas composition No. 3 while running at a rate of 400 m/min.

Combustion Gas Composition No. 3

Propane—50 g/cm/hr
Butane—33 g/cm/hr
Oxygen—550 g/cm/hr

On the other hand, the same polyethylene-coated paper was flame treated using the combustion gas composition described in British Pat. No. 1,010,649 (G in FIG. 2) while running at a rate of 400 m/min.

Combustion Gas Composition No. 4

Propane—50 g/cm/hr
Butane—33 g/cm/hr
Oxygen—310 g/cm/hr

The so obtained two supports were respectively coated with a gelatino-silver halide emulsion to prepare a water proof photographic paper. The water proof photographic paper by the combustion gas composition No. 3 showed a good adhesion in a processing and under dry state, whilst that by the combustion gas composition No. 4 did not. Regarding the specific reflecting factor of emulsion surface, the former gave 0.985 while the latter gave 0.930.

EXAMPLE 3

The surface, to be coated with the emulsion, of a polyethylene film having a thickness of 160 microns and a density of 0.965 g/cm$^3$ was flame treated using the following combustion gas composition No. 5 while running at a rate of 400 m/min.

Combustion Gas Composition No. 5

Methane—70 g/cm/hr
Oxygen—500 g/cm/hr

On the other hand, the same polyethylene film was flame treated using the combustion gas composition No. 6 described in British Pat. No. 1,010,649 (H in FIG. 2) while running at a rate of 400 m/min.

Combustion Gas Composition No. 6

Methane—116 g/cm/hr
Oxygen—425 g/cm/hr

In photographic light-sensitive materials using the so obtained two supports, the one treated with the combustion gas composition No. 5 gave a specific reflecting factor of the emulsion surface of 0.980, while the other gave a specific reflecting factor of 0.895.

EXAMPLE 4

The surface, to be coated with the emulsion, of a crystalline polypropylene film having a thickness of 180 microns and containing 10% by weight of titanium white was flame treated using the following combustion gas composition No. 7 and combustion gas composition No. 8 described in British Pat. No. 1,010,649 while running it at a rate of 200 m/min.

Combustion Gas Composition No. 7

Ethylene—32 g/cm/hr
Oxygen—320 g/cm/hr

Combustion Gas Composition No. 8

Ethylene—32 g/cm/hr
Oxygen—125 g/cm/hr

In photographic light-sensitive materials obtained by coating the so obtained two supports with a gelatino-silver halide emulsion respectively, the one using the support treated by the combustion gas composition No. 7 had a good adhesion between the emulsion layer and support and a specific reflecting factor of the emulsion surface of 0.985, while the other using the support treated by the combustion gas composition No. 8 did not have a good adhesion and showed a specific reflecting factor of the emulsion surface of 0.920 with some fog of the emulsion.

What is claimed is:

1. In a method for flame treating a polyolefinic surface of a support to be used as a support for a photographic light-sensitive material, to increase the adhesion between said surface and a subsequently-applied photographic emulsion layer, comprising treating said surface with a flame supported by a combustion gas which consists of a mixture of oxygen gas and a paraffinic or olefinic hydrocarbon gas at a temperature and for a period of time sufficient to achieve said increased adhesion, the improvement comprising obtaining excellent adhesion between said emulsion and said surface with substantially no fogging of the subsequently applied emulsion by treating said surface with a stable flame supported by a combustion gas having the composition within the area defined by points A, B, C, D, and D of FIG. 2.

2. The method of claim 1, wherein said support is a polyolefin film or a polyolefin coated paper.

3. The method of claim 2, wherein said polyolefinic surface is selected from the group consisting of polyethylene, polypropylene and mixtures thereof.

4. The method of claim 1, wherein said hydrocarbon gas is selected from the group consisting of methane, ethane, propane, butane, ethylene, propylene and mixtures thereof.

5. The method of claim 1, wherein said support surface is flame treated at a rate of from 100 to 400 meters per minute by passing said surface under said flame at said speed.

* * * * *